US007167208B2

United States Patent
Park

(10) Patent No.: US 7,167,208 B2
(45) Date of Patent: Jan. 23, 2007

(54) DIGITAL BROADCASTING RECEIVER AND METHOD FOR COMPENSATING COLOR REPRODUCTION ERROR OF THE SAME

(75) Inventor: Dong Ho Park, Gunpo-si (KR)

(73) Assignee: LG Electronics Inc., Seoul (KR)

( * ) Notice: Subject to any disclaimer, the term of this patent is extended or adjusted under 35 U.S.C. 154(b) by 491 days.

(21) Appl. No.: 10/369,750

(22) Filed: Feb. 21, 2003

(65) Prior Publication Data

US 2003/0160897 A1 Aug. 28, 2003

(30) Foreign Application Priority Data

Feb. 25, 2002 (KR) .................................. 2002-9944

(51) Int. Cl.
*H04N 7/01* (2006.01)
*H04N 11/02* (2006.01)
*H04L 7/04* (2006.01)

(52) U.S. Cl. ...................... 348/457; 348/498; 348/505; 348/520; 348/539; 375/362

(58) Field of Classification Search ................ 348/498, 348/512, 515, 505, 507, 508, 510, 457, 520, 348/539, 537, 536, 453; 375/362, 376
See application file for complete search history.

(56) References Cited

U.S. PATENT DOCUMENTS 5,473,385 A * 12/1995 Leske ...................... 375/240.26
5,612,981 A * 3/1997 Huizer ....................... 375/376
5,784,119 A * 7/1998 Noda et al. ................. 348/512

OTHER PUBLICATIONS

Canadian Patent Office Action dated Nov. 28, 2005.

* cited by examiner

Primary Examiner—Michael H. Lee
(74) Attorney, Agent, or Firm—Harness, Dickey & Pierce, P.L.C.

(57) ABSTRACT

Digital broadcasting receiver, and method for compensating a color reproduction error therein, the digital broadcasting receiver including a channel decoder, a TP part for demultiplexing a TP stream from the channel decoder for being provided with a PCR (Program Clock Reference), and receiving a receiver side STC (System Time Clock), and providing a PCR jitter which is a difference between the PCR and an STC value, an STC compensating part for providing the STC value to the TP part from a system clock, and varying the system clock so that the PCR value and the STC value are identical, to generate a reference system clock in which the PCR jitter value becomes '0', a decoder for receiving the reference system clock from the STC compensating part, and decoding a received picture, a display clock generator for providing a display clock generated by receiving the reference system clock as singular system clock, a video format and display processor for receiving the reference system clock and the display clock, and carrying out format conversion and display processing, and an analog composite picture signal generating part for compensating a sub-carrier frequency value from a reference system clock value, and encoding the received picture to provide a composite picture signal.

14 Claims, 2 Drawing Sheets

DIGITAL BROADCASTING RECEIVER AND METHOD FOR COMPENSATING COLOR REPRODUCTION ERROR OF THE SAME

This application claims the benefit of the Korean Application No. P2002-9944 filed on Feb. 25, 2002, which is hereby incorporated by reference.

BACKGROUND OF THE INVENTION

1. Field of the Invention

The present invention relates to a digital broadcasting receiver, and a method for compensating a color reproduction error therein, in which a color reproduction error of a picture signal is minimized when there is a system clock variation with reference to a Program Clock Reference (PCR).

2. Background of the Related Art

Following the ceaseless effort for putting digital broadcasting technologies into practical use for recent several years, an air borne digital television (DTV) broadcasting wave reaches even to living rooms, and receivers are supplied, partly. Starting from unitary models, there are a variety of models of the digital broadcasting receivers, such as separable set-top model.

Though there may be countless development, such as channel coding systems, various additional services, differences of the DTV broadcasting from the present analog TV broadcasting may be the extended audio channels and the quality of the high definition of video in view of audio/video that are ultimate objects of the television broadcasting stations. Especially, a high definition (HD) class digital program has achieved a resolution of five times high quality compared to the present analog broadcasting program.

A DTV signal receiver set-top provides picture signals of different formats for an HD class component, a Standard Definition (SD) class component, the present analog composite picture signals, and the like.

Of the picture signal formats, the HD class picture signal format mostly supports two kinds of chromaticity systems of a YPbPr component signal in which a synchronization signal (Sync) is included to a luminance signal Y and red, green, and blue (RGB) Hsync/Vsync having a horizontal synchronization signal component and a vertical synchronization signal component split, and two kinds of resolutions of HD1080i and HD720p.

Moreover, the HD class picture signal format has an interchangeability with a display method in which the HD class is down converted to 480 p or 480 i, both of which are of the SD Aclass, and put into practical use presently.

Particularly, it is essential that the DTV receiver has an interchangeability with the present analog TV receiver. Accordingly, all HD, and SD class DTV receivers convert a received digital broadcasting signal into an analog composite picture signal before presenting the digital broadcasting signal.

There is a big difference between receiving the present analog TV broadcasting signal and presenting the signal as an analog signal, and receiving a digital broadcasting signal and presenting the signal as an analog signal.

First of all, the analog picture signal has a form of a composite picture signal as a sync component, a color sub-carrier and the like modulated with a picture signal are demodulated with the picture signal. Therefore, the analog receiver is not required to re-construct the sync component, the sub-carrier, and the like.

However, the DTV receiver can convert a picture format of a received stream into a different format, or frame ratio.

Therefore, the synchronization signal and the like are re-constructed to be in conformity with a format to be presented finally, especially, when the picture to be present is an analog composite picture signal, the sync and the color sub-carriers are re-constructed through a digital NTSC (National Television System Committee) encoder.

Accordingly, variation of the system clock is required for recovery of the PCR from a digitally received picture processing block operative under single system clock. The system clock is varied as much as the variation of the NTSC sync and color sub-carrier in the re-construction.

When a general VCXO (Voltage Controlled Crystal Oscillator) is used, the system clock can be varied up to 100 ppm in an unsteady state, according to which the sub-carrier frequency is also varied up to 100 ppm.

In this case, if the sub-carrier frequency is not compensated, it is liable that a color demodulation error can be occurred at an analog receiver which receives a composite picture signal from a digital broadcasting receiver. In an extreme case, the composite picture signal is out of a range of color demodulation.

Therefore, a digital broadcasting receiver designed to be operative under single system clock is required to compensate the color sub-carrier for a system clock variation.

SUMMARY OF THE INVENTION

Accordingly, the present invention is directed to a digital broadcasting receiver, and a method for compensating a color reproduction error therein that substantially obviates one or more of the problems due to limitations and disadvantages of the related art.

An object of the present invention is to provide a digital broadcasting receiver which can assure stable provision of a composite picture.

Another object of the present invention is to provide a method for a color reproduction error in a digital broadcasting receiver, which can compensate a picture signal for a color reproduction error caused by a system clock variation.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, the present invention predicts a variation of a system output signal with reference to a PCR value in an incoming digital TV broadcasting stream. A color reproduction error of an output picture signal is compensated according to the predicted variation. In other words, an amount of variation of a sub-carrier frequency of an NTSC encoder caused by variation of a display reference clock of a digital TV receiver is measured as a PCR jitter value, the sub-carrier frequency is compensated for the predicted amount of system clock variation with the PCR jitter. As described, the sub-carrier frequency of the output composite picture signal for the variations of the system clock and the reference clock. Meanwhile, the compensation of the sub-carrier frequency of the output composite picture signal is carried out in a VBI (Vertical Blank Interval) of an output display interval.

In one aspect of the present invention, there is provided 1. A digital broadcasting receiver including a channel decoder, a TP part for demultiplexing a TP stream from the channel decoder for being provided with a PCR (Program Clock Reference), and receiving a receiver side STC (System Time Clock), and providing a PCR jitter which is a difference between the PCR and an STC value, an STC compensating part for providing the STC value to the TP part from a system clock, and varying the system clock so that the PCR value and the STC value are identical, to generate a reference system clock in which the PCR jitter value becomes '0', a decoder for receiving the reference system clock from the STC compensating part, and decoding a received picture, a display clock generator for providing a display clock generated by receiving the reference system clock as singular system clock, a video format and display processor for receiving the reference system clock and the display clock, and carrying out format conversion and display processing, and an analog composite picture signal generating part for compensating a sub-carrier frequency value from a reference system clock value, and encoding the received picture to provide a composite picture signal.

Preferably, the STC compensating part includes a low pass filter part for low passing the PCR jitter value from the TP part, and a VCXO for receiving a signal from the low pass filter part as a control voltage, and changing a frequency of the signal to provide a system clock.

Preferably, the analog composite picture signal generating part includes a sync generator for generating a synchronization signal from the reference system clock, a sub-carrier generator for generating a sub-carrier frequency from the reference system clock, and an analog composite picture encoder for receiving the reference system clock and the display clock, and the sync and the sub-carrier frequency from the sync generator and the sub-carrier generator, to compensate variation of the sub-carrier frequency caused by the reference system clock, encoding the received picture, and providing a composite picture signal.

Preferably, the compensation of the sub-carrier frequency is carried out in a vertical blank interval of an output display.

In another aspect of the present invention, there is provided a method for compensating a color reproduction error in a digital TV receiver, including the steps of receiving a digital television broadcasting stream, detecting a PCR from the digital television broadcasting stream, and an amount of variation of a system clock frequency with reference to a PCR value, predicting an amount of variation of the sub-carrier frequency with respect to a variation of a display reference output according to an amount of variation of the system clock frequency as a PCR jitter value, and compensating the sub-carrier frequency from the PCR jitter.

The compensation of the sub-carrier frequency is carried out in a VBI interval of a display interval.

In further aspect of the present invention, there is provided a method for compensating a color reproduction error in a digital broadcasting receiver, the color reproduction error being caused by a PCR jitter of an STC (System Time Clock) generated by a system clock of a digital broadcasting receiver and a receiver side PCR (Program Clock Reference) value, the method including the steps of defining a maximum value of the PCR jitter PWM_UPPER, minimum value of the PCR jitter PWM_LOWER, a PCR recovery loop STEP_NUM n, a number of reference frame PRIOD_FR_NUM, setting a frame counter Frame_Counter to '0', calculating an increment of the PCR jitter, increasing the frame counter and comparing the frame counter to the reference frame, resetting the frame counter and reading the PCR jitter when the frame counter is greater than the number of reference frame, comparing values to a read PCR jitter value in succession, the values being obtained by adding an 'N' (N=1, 2, - - - , n–1) times of the increment of the PCR jitter to the minimum value of the PCR jitter, setting a compensating value PHI preset for each interval as the present sub-carrier frequency compensating value Pi if the read PCR jitter value is the same with one of 'n' interval values, substituting the present sub-carrier frequency compensating value for a sub-carrier generating DTO coefficient when the present sub-carrier frequency compensating value is different from a prior sub-carrier frequency compensating value, and renewing the prior sub-carrier compensating value with the present sub-carrier frequency compensating value.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE PREFERRED EMBODIMENT

Figure 1:
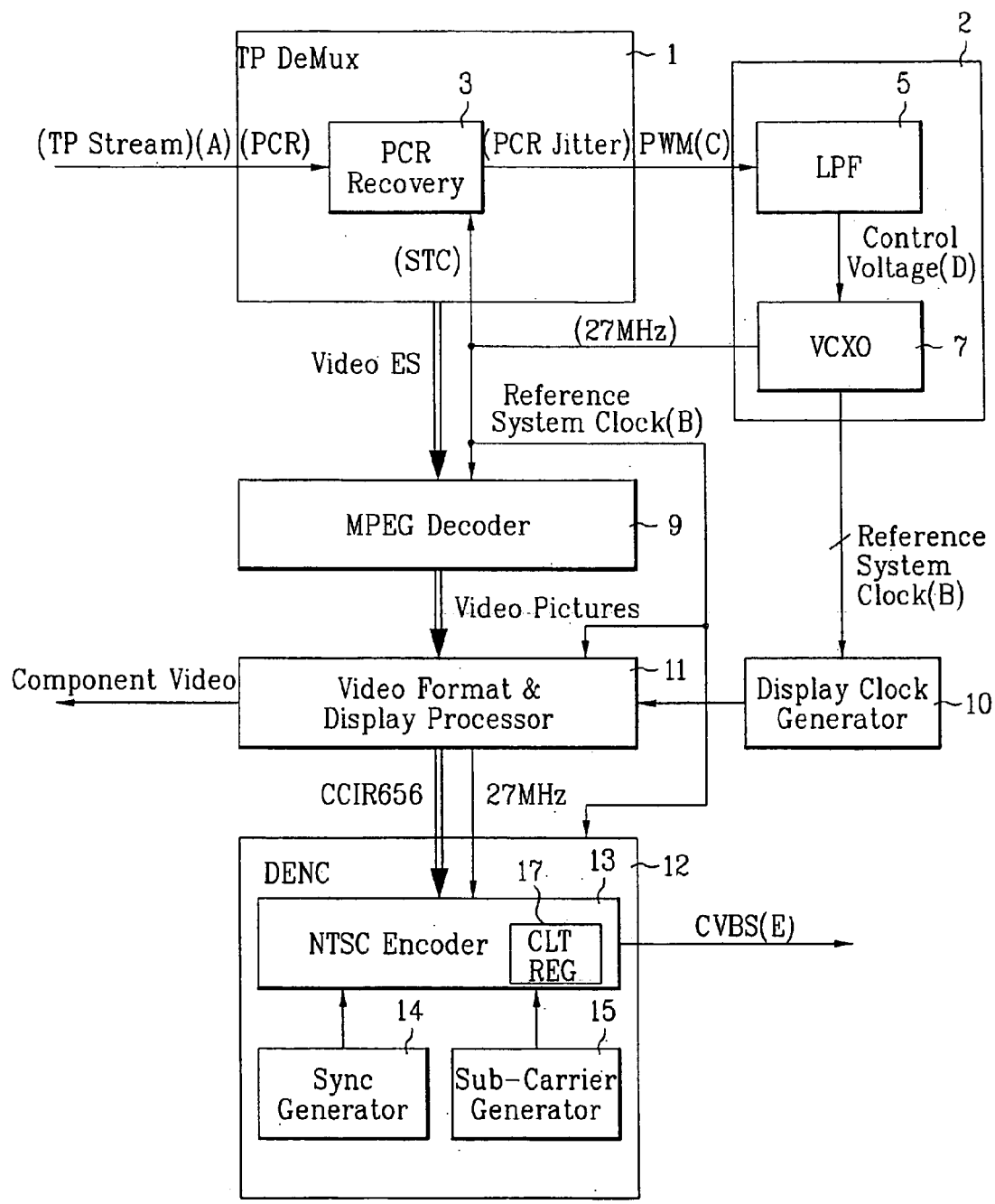
FIG. 1 illustrates a block diagram of a digital broadcasting receiver operative under single system clock in accordance with a preferred embodiment of the present invention.

Reference will now be made in detail to the preferred embodiments of the present invention, examples of which are illustrated in the accompanying drawings. FIG. 1 illustrates a block diagram of a digital broadcasting receiver operative under single system clock in accordance with a preferred embodiment of the present invention.

Referring to FIG. 1, the digital broadcasting receiver includes a channel decoder (not shown), a TP (transport) part 1, an STC (system time clock) compensating part 2, a decoder 9, a display clock generator 10, a video format and display processor 11, and an analog composite picture signal generating part 12.

A system and operation of the digital broadcasting receiver will be described with reference to FIG. 1.

The TP part 1 demultiplexes a TP stream 'A', which is a result of channel decoding at the channel decoder, to obtain a PCR, receives an STC, and provides a PCR jitter which is a difference between the PCR and the STC. That is, the PCR value of the TP stream 'A' from the channel decoder is compared to the STC value of its own calculated from the system clock 'B' of the decoder 9, and the system clock 'B' is varied so that the difference becomes '0'.

Digital TV transmitter and receiver systems require a temporal synchronization. Moreover, the TP stream 'A' includes a PCR field which includes information on the system clock of an encoder side.

The STC compensating part 2 provides the STC value from the system clock 'B' to the TP part 1, and varies the system clock 'B' so the PCR value and the STC value are the same, to generate a reference system clock in which the PCR jitter value becomes '0'.

In more detail, the STC compensating part 2 includes a low pass filter part 5 for low passing the PCR jitter value from the TP part 1, and a VCXO 7 for receiving a signal from the low pass filter part 5 as a control voltage, and changing a frequency of the signal to provide a system clock.

A PCR recovery block 3 in the TP part 1 provides the difference of the PCR value and the STC value, i.e., the PCR jitter value in a form of a PWM signal 'C' which is converted into a voltage 'D' for controlling a VCXO frequency at the appropriately designed low pass filter LPF 5. When the control voltage 'D' is applied to the VCXO 7, the VCXO 7 generates an appropriate frequency.

The VCXO 7 used in the PCR recovery at the PCR recovery block 3 is fixed according to its own physical pullability, a cut off frequency of the LPF 5, the PCR for the TP stream 'A', i.e., an accuracy of the encoder system clock.

For example, when the VCXO 7 with a 100 ppm pullability is used, though there can be 1/10000 (2700 Hz) system clock variation at the maximum due to discontinuity of the TP stream 'A' and the like, the error of 0.0001 on horizontal and vertical frequencies of display is negligible in view of practical use. Moreover, tolerances for determining for a sync timing deflection or a mode of display caused by the error are adequate.

By the PCR recovery, the frequency (the system clock 'B'), e.g., 27 MHz from the VCXO 7 is changed, and the comparison and compensation loop of the STC value calculated from the changed system clock 'B' and the PCR value in the TP stream 'A' is repeated. When the STC value and the PCR vale are identical, the loop ends, and the system clock 'B' from the VCXO 7 becomes a reference system clock.

The system clock generated as a result of recovery of the PCR recovery block 3 in the TP part 1 is used as a reference system clock at the decoder 9 and the video format and display processor 11.

The decoder 9 receives the reference system clock, and decodes a received picture. The display clock generator 10 receives the reference system clock as a singular system clock, and generates a display clock for the present display format.

The video format and display processor VDP 11 receives the reference system clock and the display clock and makes format conversion and display. An appropriate clock is used for the video format and display processor 11 depending on an output format and the frame ratio.

As a general example, a 74.175 MHz display clock is used in providing an HD format from the video format and display processor 11, depending on a frame ratio, a number of lines per a frame, a number of pixels per a line of the display.

Correspondingly, for example, a 27 MHz clock is used in providing an SD format from the video format and display processor 11, and the 27 MHz clock is also used, e. g., at the analog composite picture signal generating part 12.

The analog composite picture signal generating part 12 compensates the sub-carrier frequency value from the reference clock value, and encodes the received picture to provide a composite picture signal.

When the singular system clock is used as a reference system clock of the analog composite picture signal generating part 12, the analog composite picture signal generating part 12 provides the sync and the color sub-carrier.

The analog composite picture signal generating part 12 includes a sync generator 14 for generating a synchronization signal from the reference system clock, a sub-carrier generator 15 for generating a sub-carrier frequency from the reference system clock, and an analog composite picture encoder 13 for receiving the reference system clock and the display clock, and the sync and the sub-carrier frequency from the sync generator 14 and the sub-carrier generator 15, to compensate variation of the sub-carrier frequency caused by the reference system clock, encoding a received picture, and providing a composite picture signal.

The analog composite picture encoder 13 includes a control register for changing the sub-carrier frequency.

Thus, the PCR recovery block 3 in the digital broadcasting receiver of the present invention generates a PCR jitter for temporal synchronization with the transmitter side, the PCR jitter varies a frequency of the system clock 'B', the frequency variation of the system clock 'B' varies horizontal and vertical frequencies of the display in a case of a system the display clock thereof is a singular system clock.

If, for example, the variation of the system clock 'B' is 1/10000, then the variation of the frequency of the sub-carrier is ±358 Hz, which is 1/10000 of 3.58 MHz.

A general digital NTSC encoder has a control register for varying the color sub-carrier frequency, wherein a control value and an output frequency have linear relation. For example, the analog picture encoder 13 includes a control register 17, in which is stored, e.g., a bus-carrier generation DTO (Digital Testing Oscilloscope) coefficient. Therefore, in a case a general NTSC receiver, depending on an extent of variation of the color sub-carrier frequency, a demodulated color is distorted, and when excessive, the color demodulation can not be made.

Therefore, in the digital broadcasting receiver using the singular system clock, when a received picture is encoded into a composite picture signal CVBS:E, if the color sub-carrier frequency is compensated as much as the variation of the system clock, above problem can be solved.

Figure 2:
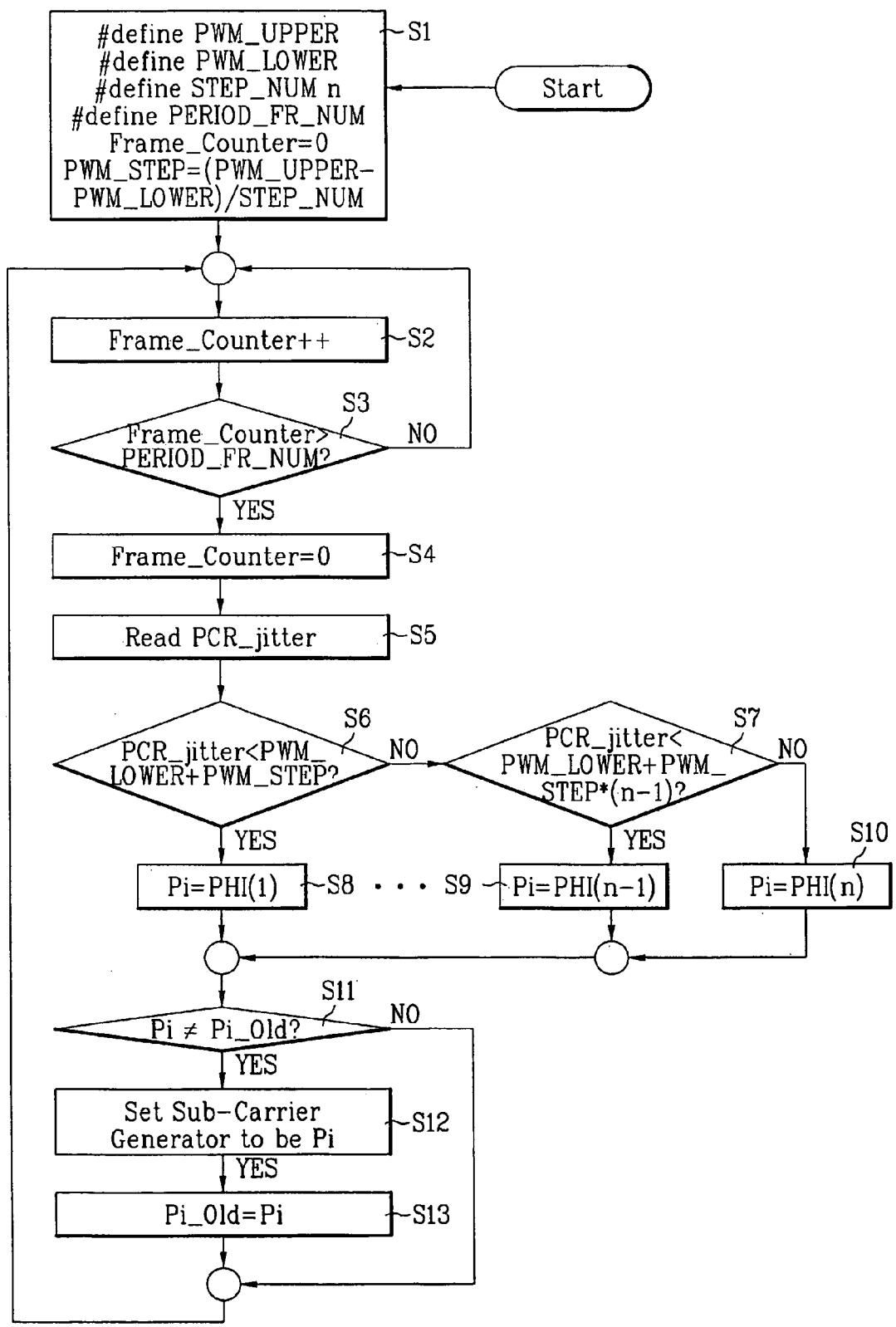
FIG. 2 illustrates a flow chart showing the steps of a method for compensating a sub-carrier frequency in a digital broadcasting receiver in accordance with a preferred embodiment of the present invention.

FIG. 2 illustrates a flow chart showing the steps of a method for compensating a sub-carrier frequency in a digital broadcasting receiver in accordance with a preferred embodiment of the present invention, wherein a method for compensating a difference between a PCR and a decoder STC, i.e., a method for a predicting a system clock frequency by using a PCR jitter value, and compensating a composite picture signal sub-carrier frequency therefor are shown in detail.

The steps in FIG. 2 are carried out according to periods of interrupts generated at every display vertical sync.

First of all, values of a number of reference frames PERIOD_FR_NUM are defined, which are fixed taking a maximum value of PCR jitters PWM_UPPER, a minimum value of the PCR jitters PWM_LOWER, a number of PCR recovery loops STEP_NUM n, and a system clock correction time into account, the frame counter Frame_Counter is set to '0', and an increment of the PCR jitter {PWN_STEP= (PWM_UPPER−PWM_LOWER)/STEP_NUMn} is calculated (S1).

The PWM_UPPER and PWM_LOWER denote a PCR recovery range, i.e., maximum and minimum of the PCR jitter which can be compensated in the system. The STEP_NUM denotes steps required in the compensation, i.e., steps required for compensation of the color sub-carrier variation. The PERIOD_FR_NUM is an integer denoting a number of reference frames. The PWM_STEP denotes an increment of the PCR jitter required for compensation of the color sub-carrier variation. If STEP_NUM n is 10, the PWM_STEP can be expressed as PWM_STEP=(PWM_UPPER−PWM_LOWER)/10.

It is assumed that the VCXO 7 has a 200 ppm of pullability, physically. In addition to this, it is assumed that a range of variation of the system clock is 100 ppm owing to the PWM_UPPER, the PWM_LOWER, and properly designed LPF 5.

In this instance, a range of variation of the sub-carrier frequency which is not compensated is in a range of 358 Hz, 1/10000 of 3.58 MHz, when the color demodulation error is occurred at the digital broadcasting receiver.

Accordingly, it is needless to say that no occurrence of color demodulation error is required, and a reproduction error of the demodulated color is minimized, by compensating the sub-carrier frequency to be in the vicinity of 3.58 MHz at every variation step.

If the STEP_NUM n is 10 the same as above assumption, an error range of the sub-carrier is approx. ±36 Hz. In view of practical use, a range of 10 steps can provide an adequate compensation effect. The number of steps can be selected by a user as required.

If the prediction of variation of the system clock following the PCR jitter and the compensation of the color sub-carrier are made at any moment in an actual system, there can be a transition time period of the color demodulation due to transition time periods of the sub-carrier frequency and phase in demodulation at the receiver. Therefore, it is required to fix appropriate time point and period of the sub-carrier compensation.

A displayed picture signal has a fixed frame ratio, and a temporal relation between the frames is dependent on the vertical sync signal period. The vertical sync signal is divided into an effective scan interval where an actual picture data presents, and a blank interval which is a flyback interval. In the effective scan interval, an actual display is made, and in the blank interval, no display is made. Therefore, if the color sub-carrier frequency compensation is made in synchronization with starting of the blank interval in the vertical sync signal, the unstable picture caused by the compensation transition can be removed.

In order to determine a period (integer times of a frame rate) for compensating the color sub-carrier frequency, the PERIOD_FR_NUM is used.

A slope of a system clock variation caused by the PCR recovery is dependent on the PCR jitter and a characteristic of a PCR recovery loop filter, i.e., a bandwidth. It is known from experiment that the slope of the variation can be fixed if the variation of the PCR jitter is checked at intervals of 20–30 times of a display period. Therefore, the PERIOD_FR_NUM is fixed to have a value of 20–30.

Moreover, by comparing the frame counter Frame_Counter increased to an interrupt period to the PERIOD_FR_NUM, the color sub-carrier frequency compensation period can be adjusted, appropriately.

That is, the frame counter Frame_Counter is increased (S2), and the frame counter Frame_Counter and the number of reference frame PERIOD_FR_NUM are compared (S3).

Moreover, the frame counter Frame_Counter increases every time an interrupt service routine is called, and the interrupt service routine is called at every display vertical sync. Accordingly, a video processor in the DTV receiver provides an interrupt pulse to a CPU at every vertical sync period.

The frame counter Frame_Counter resets (S4) when the frame counter Frame_Counter is greater than the number of the reference frame PERIOD_FR_NUM, and a jitter value PCR_jitter between the PCR and the STC is read (S5).

The read PCR jitter value represents the variation of the sub-carrier frequency. It is determined into which one of 'n' intervals between the maximum and minimum of the PCR jitter the read PCR jitter falls (S6 and S7). Compensation values PHI are preset for the n intervals, respectively. Depending upon which of the n intervals the read PCR jitter falls into, the corresponding value of PHI gets assigned to the present sub-carrier frequency compensation values Pi (S8, S9, and S10).

It is determined if the present sub-carrier frequency compensation value Pi is identical to a prior sub-carrier frequency compensation value Pi_Old (S11). The prior sub-carrier frequency compensation value Pi_Old is defined as a static variable.

If the present sub-carrier frequency compensation value Pi is identical to the prior sub-carrier frequency compensation value Pi_Old, as a result of the comparison, no frequency compensation is made.

When the present sub-carrier frequency compensation value Pi is different from the prior sub-carrier frequency compensation value Pi_Old, i.e., only when the PCR jitter is found to have moved to another interval value during a preset check period, the present sub-carrier frequency compensation value Pi replaces a sub-carrier generation DTO (Digital Testing Oscilloscope) coefficient of the NTSC encoder (S12). Then, the present sub-carrier frequency compensation value Pi is allocated to the prior sub-carrier frequency compensation value $Pi_{13}$ Old, and becomes a reference of determining compensation at the next compensation time point (S13).

Because the foregoing process is carried out in synchronization with the display frame period within a frame interrupt service routine, a momentary transition period caused by the variation of the sub-carrier generation DTO coefficient can be hidden.

As described, the digital broadcasting receiver, and method for compensating a color reproduction error therein have the following advantages.

The appropriate sub-carrier compensation for a system clock variation coming from a stream characteristic of the composite picture from a DTV settop permits to maintain the sub-carrier frequency always within a predetermined range, thereby assuring stable color demodulation at a receiver.

The synchronization of the sub-carrier compensation to fall within a vertical blank interval, which makes a color reproduction transition period coming from the sub-carrier variation invisible on an actual picture, assures a stable provision of a composite video including an OSD.

Moreover, the present invention employs a digital NTSC encoder for providing a composite picture, and is widely applicable to fields of DVD and the like in which PCR (or SCR) recovery is carried out.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. A digital broadcasting receiver comprising:
a display clock generator for providing a display clock generated by receiving a reference system clock, which includes a PCR jitter generated from a PCR (Program Clock Reference) and STC (System Time Clock), as singular system clock;

a video format and display processor for receiving the reference system clock and the display clock, and carrying out format conversion and display processing; and an analog composite picture signal generating part for compensating a sub-carrier frequency value from a reference system clock value, and encoding the received picture to provide a composite picture signal, wherein the analog composite picture signal generating part compensates variation of a sub-carrier by using a compensation value in proportion to the difference between a maximum value and a minimum value of the PCR jitter.

2. The digital broadcasting receiver as claimed in claim 1, wherein the analog composite picture signal generating part includes;

a sync generator for generating a synchronization signal from the 0072eference system clock, a sub-carrier generator for generating a sub-carrier frequency from the reference system clock, and an analog composite picture encoder for receiving the reference system clock and the display clock, and the sync and the sub-carrier frequency from the sync generator and the sub-carrier generator, to compensate variation of the sub-carrier frequency caused by the reference system clock, encoding the received picture, and providing a composite picture signal.

3. The digital broadcasting receiver as claimed in claim 1, wherein the compensation of the sub-carrier frequency is carried out in a vertical blank interval of an output display.

4. A method for compensating a color reproduction error in a digital TV receiver, comprising the steps of:

receiving a digital television broadcasting stream;

detecting a PCR from the digital television broadcasting stream, and an amount of variation of a system clock frequency with reference to a PCR value;

predicting an amount of variation of the sub-carrier frequency with respect to a variation of a display reference output according to an amount of variation of the system clock frequency as a PCR jitter value; and compensating the sub-carrier frequency by using a compensation value in proportion to the difference between a maximum value and a minimum value of the PCR jitter value.

5. A method as claimed in claim 4, wherein the compensation of the sub-carrier frequency is carried out in a VBI interval of a display interval.

6. A method for compensating a color reproduction error in a digital broadcasting receiver, the color reproduction error being caused by a PCR jitter of an STC (System Time Clock) generated by a system clock of a digital broadcasting receiver and a receiver side PCR (Program Clock Reference) value, the method comprising the steps of:

defining a maximum value of the PCR jitter, minimum value of the PCR jitter, a PCR recovery loop, a number of reference frame;

setting a frame counter to '0';

calculating an increment of the PCR jitter;

increasing the frame counter and comparing the frame counter to the reference frame;

resetting the frame counter and reading the PCR jitter when the frame counter is greater than the number of reference frame;

comparing values to a read PCR jitter value in succession, the values being obtained by adding an integer 'N' (N=1, 2, - - -, n−1) times of the increment of the PCR jitter to the minimum value of the PCR jitter;

setting a compensating value preset for each interval as the present sub-carrier frequency compensating value if the read PCR jitter value is the same with one of 'n' interval values;

substituting the present sub-carrier frequency compensating value for a sub-carrier generating coefficient if the present sub-carrier frequency compensating value is different from a prior sub-carrier frequency compensating value; and renewing the prior sub-carrier compensating value with the present sub-carrier frequency compensating value.

7. A digital broadcasting receiver comprising:

a PCR recovery block to generate a PCR jitter signal according to a Program Clock Reference (PCR) and a system clock; and a video format and display processor to
quantize the PCR jitter signal,
determine a compensation value according to the quantized PCR jitter signal, and
adjust a sub-carrier frequency according to the compensation value.

8. The digital broadcasting receiver as claimed in claim 7, wherein:

the PCR recovery block is operable to generate the PCR jitter signal as the difference between the PCR and the system clock.

9. The digital broadcasting receiver as claimed in claim 8, further comprising:

a system clock generator to generate the system clock and vary the same to reduce the PCR jitter signal.

10. A digital broadcasting receiver comprising:

a PCR recovery block to generate a PCR jitter signal according to a Program Clock Reference (PCR) and a system clock; and a video format and display processor to
determine a compensation value according to the PCR jitter signal, and
adjust a sub-carrier frequency according to the compensation value;
wherein the video format and display processor is further operable to do the following,
provide a relationship between a first plurality of intervals, extending from a minimum jitter reference value to a maximum jitter reference value, and a second plurality of compensation factors,
determine into which among the first plurality of intervals a sample of the PCR jitter signal fits, and
set the compensation value according to one of the second plurality of compensation factors corresponding to the determined interval.

11. A method of adjusting a sub-carrier frequency in a digital television receiver, the method comprising:

generating a PCR hitter signal according to a Program Clock Reference (PCR) and a system clock;

quantizing the PCR jitter signal;

determining a compensation value according to the quantized PCR jitter signal; and adjusting a sub-carrier frequency according to the compensation value.

12. The method as claimed in claim 11, wherein:

the generating step generates the PCR jitter signal as the difference between the PCR and the system clock.

13. The method as claimed in claim 11, further comprising:
varying the system clock to reduce the PCR jitter signal.

14. A method of adjusting a sub-carrier frequency in a digital television receiver, the method comprising:
generating a PCR jitter signal according to a Program Clock Reference (PCR) and a system clock;
determining a compensation value according to the PCR jitter signal; and
adjusting a sub-carrier frequency according to the compensation value;
wherein the adjusting step includes includes the following,
providing a relationship between a first plurality of intervals, extending from a minimum jitter reference value to a maximum jitter reference value, and a second plurality of compensation factors,
determining into which among the first plurality of intervals a sample of the PCR jitter signal fits, and
setting the compensation value according to one of the second plurality of compensation factors corresponding to the determined interval.

* * * * *